(12) United States Patent
Mizutani et al.

(10) Patent No.: US 9,097,796 B2
(45) Date of Patent: Aug. 4, 2015

(54) RADAR APPARATUS

(75) Inventors: Akiyoshi Mizutani, Nagoya (JP); Kazuma Natsume, Obu (JP); Yoshihiro Abe, Kariya (JP)

(73) Assignee: DENSO CORPORATION, Kariya (JP)

(*) Notice: Subject to any disclaimer, the term of this patent is extended or adjusted under 35 U.S.C. 154(b) by 370 days.

(21) Appl. No.: 13/292,438

(22) Filed: Nov. 9, 2011

(65) Prior Publication Data

US 2012/0119939 A1     May 17, 2012

(30) Foreign Application Priority Data

Nov. 12, 2010   (JP) .................................. 2010-253928

(51) Int. Cl.
| | |
|---|---|
| *G01S 13/34* | (2006.01) |
| *G01S 3/46* | (2006.01) |
| *G01S 7/35* | (2006.01) |
| *G01S 13/42* | (2006.01) |
| *G01S 13/58* | (2006.01) |
| *G01S 13/93* | (2006.01) |

(52) U.S. Cl.
CPC .............. *G01S 13/345* (2013.01); *G01S 3/465* (2013.01); *G01S 7/354* (2013.01); *G01S 13/42* (2013.01); *G01S 13/58* (2013.01); *G01S 13/343* (2013.01); *G01S 13/931* (2013.01)

(58) Field of Classification Search
CPC ..... G01S 13/345; G01S 13/34; G01S 13/343; G01S 13/42; G01S 13/58; G01S 7/354; G01S 3/465; G01S 13/931
USPC ........................................................ 342/128
See application file for complete search history.

(56) References Cited

U.S. PATENT DOCUMENTS

| | | | | |
|---|---|---|---|---|
| 6,292,129 | B1 * | 9/2001 | Matsugatani et al. | 342/70 |
| 6,445,339 | B1 * | 9/2002 | Yamada | 342/128 |
| 6,646,589 | B2 * | 11/2003 | Natsume | 342/70 |
| 6,741,204 | B2 * | 5/2004 | Kumon et al. | 342/70 |
| 6,768,446 | B2 * | 7/2004 | Tamatsu et al. | 342/70 |
| 6,924,762 | B2 * | 8/2005 | Miyake et al. | 342/70 |
| 6,970,129 | B2 * | 11/2005 | Kumon et al. | 342/70 |

(Continued)

FOREIGN PATENT DOCUMENTS

| | | |
|---|---|---|
| JP | 2001-124846 | 5/2001 |
| JP | 2001-324565 | 11/2001 |

OTHER PUBLICATIONS

Office action dated Oct. 11, 2013 in corresponding Chinese Application No. 201110371822.7.

(Continued)

*Primary Examiner* — Matthew M Baker
(74) *Attorney, Agent, or Firm* — Harness, Dickey & Pierce, PLC

(57) ABSTRACT

A radar apparatus includes a transmitter, a receiver, and a signal processor. The transmitter outputs a radar wave. The receiver includes a plurality of receiving antennas and a plurality of receiving devices. Each of the receiving devices mixes a reception signal from the corresponding receiving antenna with a local signal and outputs a beat signal. The signal processor samples the beat signal while selecting one of the receiving devices in order with a selecting period that is less than a half of a sampling period. The signal processor samples the beat signal with the sampling period and derives position information of a target by pair matching of peaks of a rising-modulation signal and a falling-modulation signal of the beat signal.

6 Claims, 11 Drawing Sheets

(56) References Cited

U.S. PATENT DOCUMENTS

| | | | |
|---|---|---|---|
| 7,151,482 B2* | 12/2006 | Natsume et al. | 342/147 |
| 7,173,561 B2* | 2/2007 | Isaji | 342/70 |
| 7,187,321 B2* | 3/2007 | Watanabe et al. | 342/173 |
| 7,289,058 B2* | 10/2007 | Shima | 342/70 |
| 7,349,771 B2* | 3/2008 | Sakuma | 701/1 |
| 7,486,223 B2* | 2/2009 | Shima | 342/70 |
| 7,495,604 B2* | 2/2009 | Yamano et al. | 342/107 |
| 7,504,990 B2* | 3/2009 | Isaji | 342/109 |
| 7,545,310 B2* | 6/2009 | Matsuoka | 342/70 |
| 7,567,204 B2* | 7/2009 | Sakamoto | 342/91 |
| 7,663,537 B2* | 2/2010 | Suzuki et al. | 342/133 |
| 7,688,255 B2* | 3/2010 | Suzuki et al. | 342/133 |
| 7,692,575 B2* | 4/2010 | Nishimura | 342/70 |
| 7,705,771 B2* | 4/2010 | Kato et al. | 342/70 |
| 7,710,312 B2* | 5/2010 | Kato et al. | 342/70 |
| 7,724,181 B2* | 5/2010 | Natsume | 342/108 |
| 7,728,762 B2* | 6/2010 | Sakamoto | 342/70 |
| 7,755,534 B2* | 7/2010 | Samukawa et al. | 342/104 |
| 7,755,537 B2* | 7/2010 | Shimizu | 342/147 |
| 7,760,133 B2* | 7/2010 | Shirai et al. | 342/159 |
| 7,852,258 B2* | 12/2010 | Kato et al. | 342/82 |
| 7,898,460 B2* | 3/2011 | Nishimura et al. | 342/27 |
| 7,907,083 B2* | 3/2011 | Sakamoto et al. | 342/70 |
| 7,928,897 B2* | 4/2011 | Ishii et al. | 342/105 |
| 8,144,049 B2* | 3/2012 | Mizutani et al. | 342/147 |
| 8,149,158 B2* | 4/2012 | Samukawa et al. | 342/70 |
| 2003/0052813 A1* | 3/2003 | Natsume | 342/70 |
| 2004/0125011 A1* | 7/2004 | Kumon et al. | 342/70 |
| 2004/0183713 A1* | 9/2004 | Kumon et al. | 342/70 |
| 2007/0018886 A1 | 1/2007 | Watanabe et al. | |
| 2008/0036645 A1* | 2/2008 | Yamano et al. | 342/109 |
| 2008/0048906 A1* | 2/2008 | Suzuki et al. | 342/70 |
| 2008/0100499 A1* | 5/2008 | Nishimura | 342/75 |
| 2008/0231497 A1* | 9/2008 | Sakamoto | 342/70 |
| 2009/0021422 A1* | 1/2009 | Abe et al. | 342/195 |
| 2009/0096661 A1* | 4/2009 | Sakamoto | 342/92 |
| 2009/0102700 A1* | 4/2009 | Kato et al. | 342/173 |
| 2009/0140911 A1* | 6/2009 | Kato et al. | 342/70 |
| 2009/0140912 A1* | 6/2009 | Kato et al. | 342/70 |
| 2009/0224960 A1* | 9/2009 | Ishii et al. | 342/104 |
| 2009/0231182 A1* | 9/2009 | Nishimura et al. | 342/70 |
| 2009/0303105 A1* | 12/2009 | Ando | 342/123 |
| 2010/0019950 A1* | 1/2010 | Yamano et al. | 342/104 |
| 2010/0075618 A1* | 3/2010 | Isaji | 455/90.1 |
| 2012/0056773 A1* | 3/2012 | Sato | 342/109 |
| 2012/0112955 A1* | 5/2012 | Ando et al. | 342/159 |
| 2012/0119938 A1* | 5/2012 | Abe et al. | 342/107 |

OTHER PUBLICATIONS

Office action dated May 4, 2014 in corresponding Chinese Application No. 201110371822.7.

Office Action dated Oct. 20, 2014 in corresponding Chinese Application No. 201110371822.7 with English translation.

Decision of Rejection dated Apr. 16, 2015 in the corresponding CN Application No. 201110371822.7 with English translation.

* cited by examiner

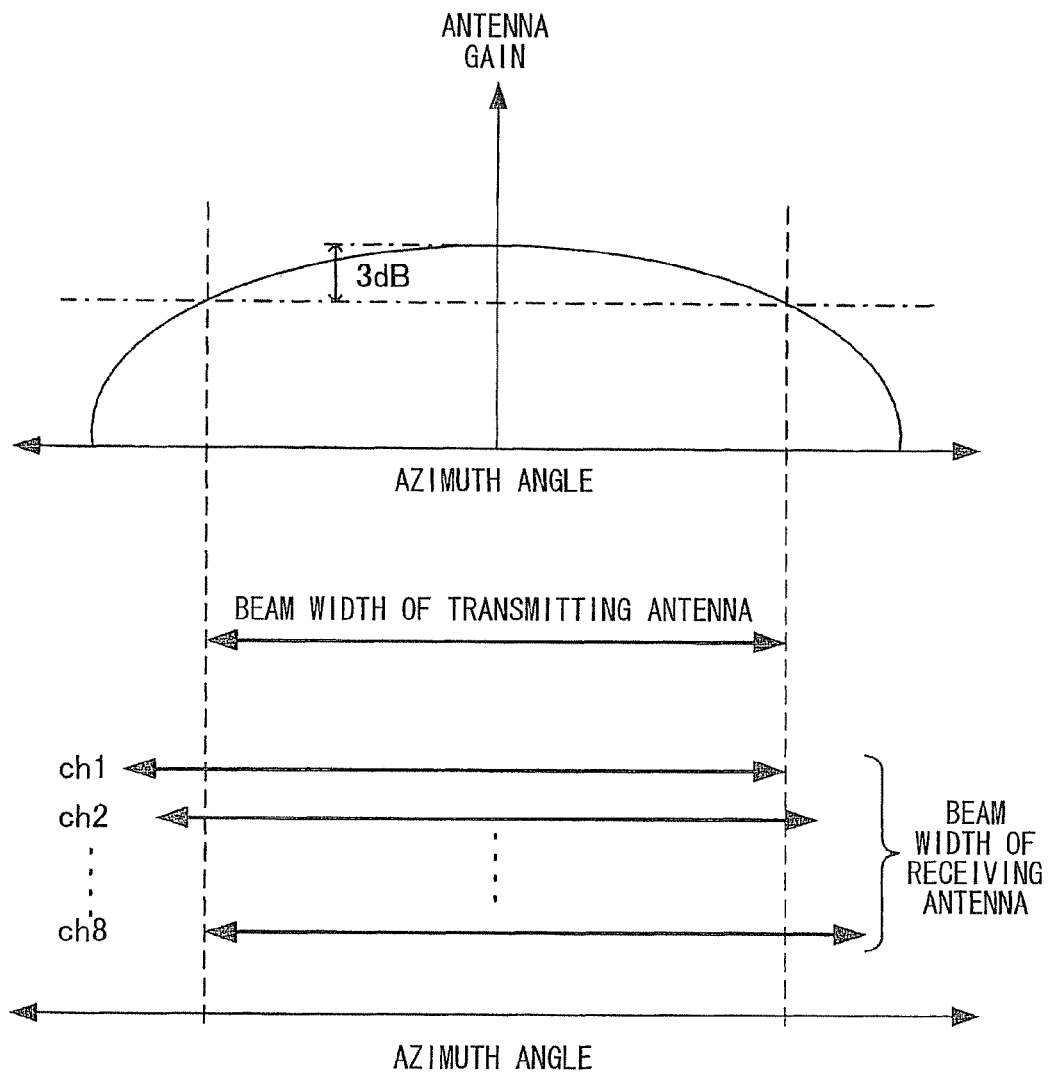

ACTUAL TARGET

FOLDED TARGET

90°  90°
UP   DOWN

RADAR APPARATUS

CROSS REFERENCE TO RELATED APPLICATIONS

The present application is based on and claims priority to Japanese Patent Application No. 2010-253928 filed on Nov. 12, 2010, the contents of which are incorporated in their entirety herein by reference.

TECHNICAL FIELD

The present invention relates to a radar apparatus that detects position information of a target.

BACKGROUND

A radar apparatus is disposed in a vehicle and is used as a safety device for collision prevention. As an example of a radar apparatus disposed in a vehicle, a frequency-modulated continuous wave radar apparatus (FWCW radar apparatus) is used. The FWCW radar apparatus can detect both a distance to and a relative speed of a target. The FWCW radar apparatus has a simple configuration and is appropriate for reducing a dimension and a cost.

The FM-CW radar apparatus transmits a transmission signal Ss, which is frequency-modulated with a triangular wave to have a frequency increased and decreased gradually in a linear fashion, and receives a wave reflected by a target as a reception signal Sr.

The reception signal Sr delays for a time Td for which the transmitted and received wave takes to travel from the radar apparatus to the target and back, that is, time depending upon the distance to the target, and the reception signal Sr is Doppler-shifted in frequency by Fd depending upon the relative speed of the radar apparatus and the target.

The reception signal Sr and the transmission signal Ss are mixed together by a mixer to produce a beat signal B, whose frequency is equal to a difference in frequency between the reception signal Sr and the transmission signal Sb. If the frequency of the beat signal B (hereafter, referred to as an upbeat signal Bu) when the frequency of the transmission signal Ss is increased (hereafter, referred to as a beat frequency in a modulated frequency-rising range) is defined as fu, and the frequency of the beat signal B (hereafter, referred to as a downbeat signal Bd) when the frequency of the transmission signal Ss is decreased (hereafter, referred to as a beat frequency in a modulated frequency-falling range) is defined as fd, a distance R to and a relative speed V of the target may be expressed as:

$$R = \frac{c \cdot T}{8 \cdot \Delta F} \cdot (fu + fd) \quad (1)$$

$$V = \frac{c}{4 \cdot F0} \cdot (fu - fd) \quad (2)$$

where c is a propagation speed of a radio wave, T is a period of the triangular wave for modulation of the transmission signal Ss, AF is a variation in frequency of the transmission signal Ss, and Fo is a central frequency of the transmission signal Ss.

In a radar apparatus disposed in a vehicle, it is important to measure the azimuth or angular direction of a target as well as the distance R to and the relative speed V of the target.

Japanese Patent No. 3,622,565 (corresponding to U.S. Pat. No. 6,292,129) discloses a radar apparatus capable of detecting an azimuth of a target. The radar apparatus includes a plurality of receiving antennas and a receiver. The receiver includes a receiver switch, a switching control circuit and a receiving circuit. The receiving antennas are divided into a plurality of receiving group. The receiver switch selectively establishes communication between one of the receiving antennas in each receiving group and the receiving circuit. The switching control circuit controls an operation of the receiver switch so as to change the communications between the receiving antennas and the receiving circuit in sequence in a cycle shorter than a cycle of a change in a frequency of a transmission signal. The receiving circuits mix the reception signals from the receiving antennas in each receiving group with a local signal to generate a reception signal Sr. The radar apparatus acquires azimuth information as well as a distance and a relative speed by pair matching of peaks of an upbeat signal Bu and a downbeat signal Bd output from a mixer and an arrangement of the receiving antennas which are selected at the time.

In a radar apparatus that derives information including a position of a target by pair matching of peaks of an upbeat signal Bu and a downbeat signal using a FMCM method, when a digital signal processing such as fast Fourier transformation (FFT) is carried out, a reception signal of a target that is present at a distance greater than a Nyquist frequency to a sampling frequency of the reception signal may be folded to a position less than the Nyquist frequency, the target at a long distance may appear at a short distance, and erroneous detection may be caused.

SUMMARY

In view of the foregoing problems, it is an object of the present invention to provide a radar apparatus that can restrict erroneous detection.

A radar apparatus according to a first aspect of the present invention includes a transmitter, a receiver, and a signal processor. The transmitter generates a transmission signal having a frequency periodically changing with time and outputs the transmission signal as a radar wave. The receiver receives the radar wave reflected by a target and generates a beat signal based on a reception signal of the radar wave and a local signal having a frequency same as the transmission signal. The signal processor samples the beat signal generated by the receiver with a sampling period and derives at least position information of the target by pair matching of peaks of a rising-modulation signal and a falling-modulation signals of the beat signal. The receiver includes a plurality of receiving antennas and a plurality of receiving devices respectively coupled with the plurality of receiving antennas. Each of the receiving devices mixes the reception signal from the corresponding receiving antenna with the local signal and outputs a mixed signal as the beat signal. The signal processor samples the beat signal while selecting one of the plurality of receiving devices in order with a selecting period that is less than a half of the sampling period.

The radar apparatus according to the first aspect can restrict generation of aliasing and can restrict erroneous detection.

A radar apparatus according to a second aspect of the present invention includes a transmitter, a receiver, and a signal processor. The transmitter generates a transmission signal having a frequency periodically changing with time and outputs the transmission signal as a radar wave. The receiver receives the radar wave reflected by a target and generates a beat signal based on a reception signal of the radar wave and a local signal having a frequency same as the transmission signal. The signal processor samples the beat signal generated by the receiver with a sampling period and derives at least position information of the target by pair matching of peaks of a rising-modulation signal and a falling-modulation signals of the beat signal. The receiver includes a plurality of receiving antennas, a receiving device, a receiver switch, and a selection control portion. The receiver switch supplies the reception signal of one of the plurality of receiving antennas to the receiving device. The receiving device mixes the reception signal from the one of the plurality of receiving antennas with the local signal. The selection control portion instructs the receiver switch to select one of the plurality of receiving devices in order with a selecting period that is less than a half of the sampling period.

The radar apparatus according to the second aspect can restrict generation of aliasing and can restrict erroneous detection.

BRIEF DESCRIPTION OF THE DRAWINGS

Additional objects and advantages of the present invention will be more readily apparent from the following detailed description of embodiments when taken together with the accompanying drawings. In the drawings:

FIG. 2 is a diagram showing a relationship between beam widths of a transmitting antenna and receiving antennas;

DETAILED DESCRIPTION

Figure 1:
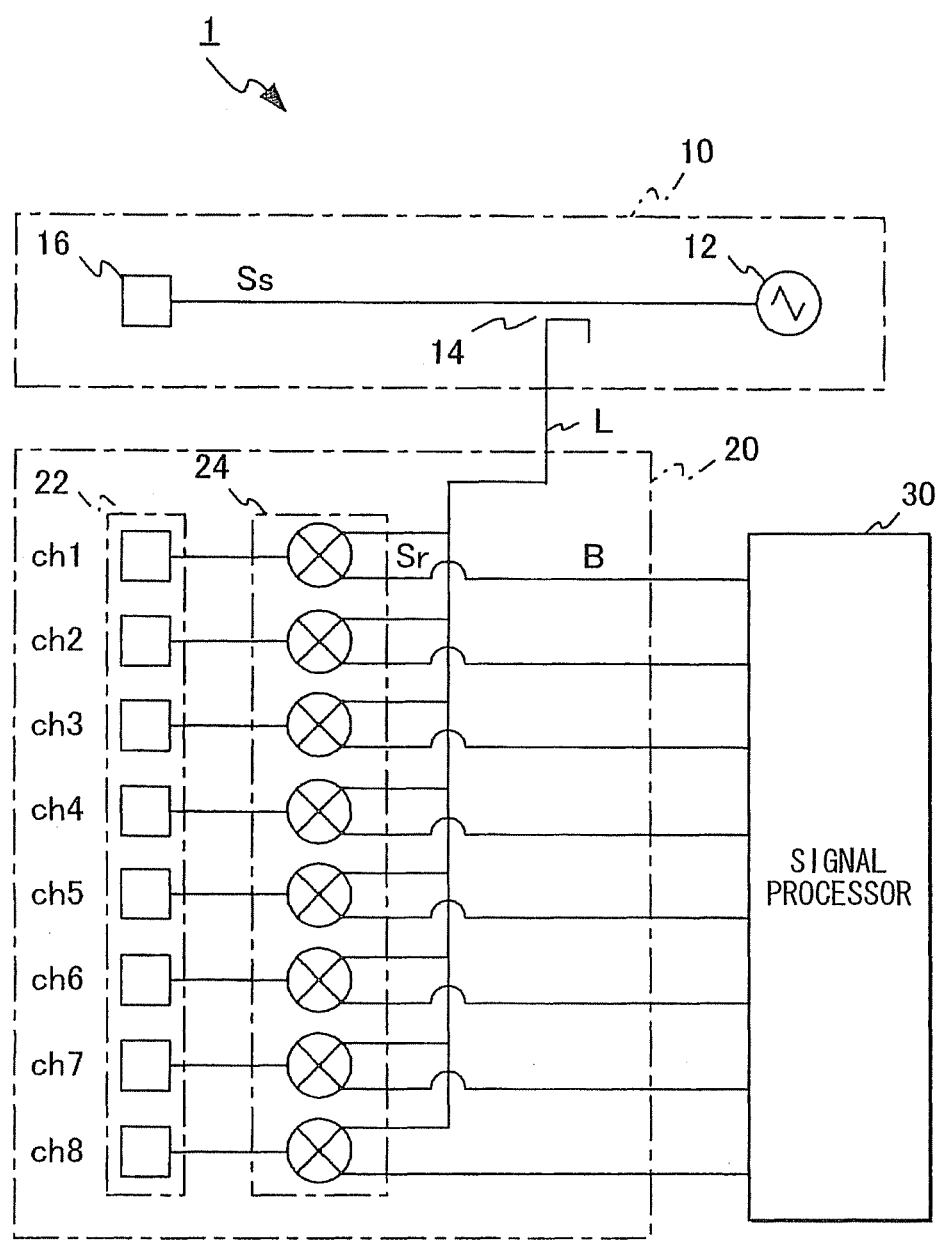
FIG. 1 is a block diagram showing a radar apparatus according to a first embodiment of the present disclosure.

Before describing embodiments of the present disclosure, various aspects of the present disclosure will be described with reference to FIG. 9 to FIG. 13.

In the present section, reference numerals used in the embodiments are attached in order to facilitate understanding of the present section. Note that the scope of the present invention should not be limited by the reference numerals.

A radar apparatus (1) according to a first aspect of the present disclosure includes a transmitter (10), a receiver (20), and a signal processor (30).

The transmitter (10) generates a transmission signal that has a frequency periodically changing with time and outputs the transmission signal as a radar wave. The receiver (20) receives the radar wave output from transmitter (10) and reflected by a target and generates a beat signal B based on a reception signal of the radar wave and a local signal having the same frequency as the transmission signal.

The signal processor (30) samples the beat signal B generated by the receiver (20) at a predetermined sampling period Ts, and derives at least position information of the target by pair matching of peaks of a rising-modulation signal of the beat signal B (an upbeat signal Bu) and a falling-modulation signal (a downbeat signal Bd). The receiver (20) includes a plurality of receiving antennas (22) and a plurality of receiving devices (24).

The receiving devices (24) are respectively coupled with the receiving antennas (22), mix the reception signals from the receiving antennas (22) with a local signal and output the mixed signals. The signal processor (30) samples output signals of the receiving devices (24) in an array order with a selecting period that is shorter than a half of a sampling period.

Figure 9:
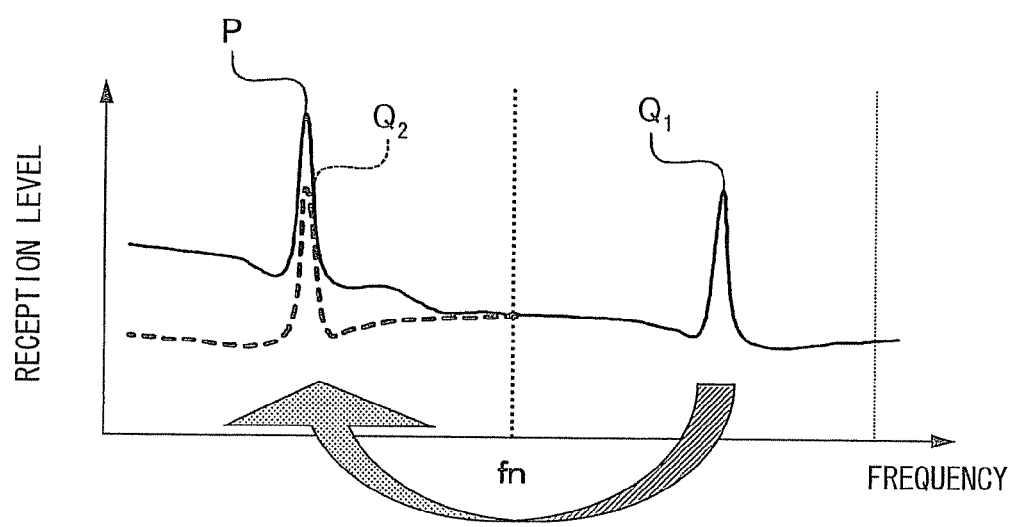
FIG. 9 is a diagram showing a folding of a beat signal with respect to a Nyquist frequency.

The radar apparatus (1) having the above-described configuration can restrict erroneous detection of a target. In general, as shown in FIG. 9, when a sampling of beat signals B is carried out, a beat signal B of a target, which is shown by a solid line Q1, at a distance corresponding to a higher frequency than a Nyquist frequency fn to a sampling frequency fs, is folded with respect to the Nyquist frequency, and thereby aliasing, which is shown by a dashed line Q2, is generated. The aliasing means that the beat signal B is folded toward a low frequency side line-symmetrically with respect to the Nyquist frequency fn as shown by an arrow. Thus, the target which is actually present at a long distance appears at a short distance.

Figure 10:
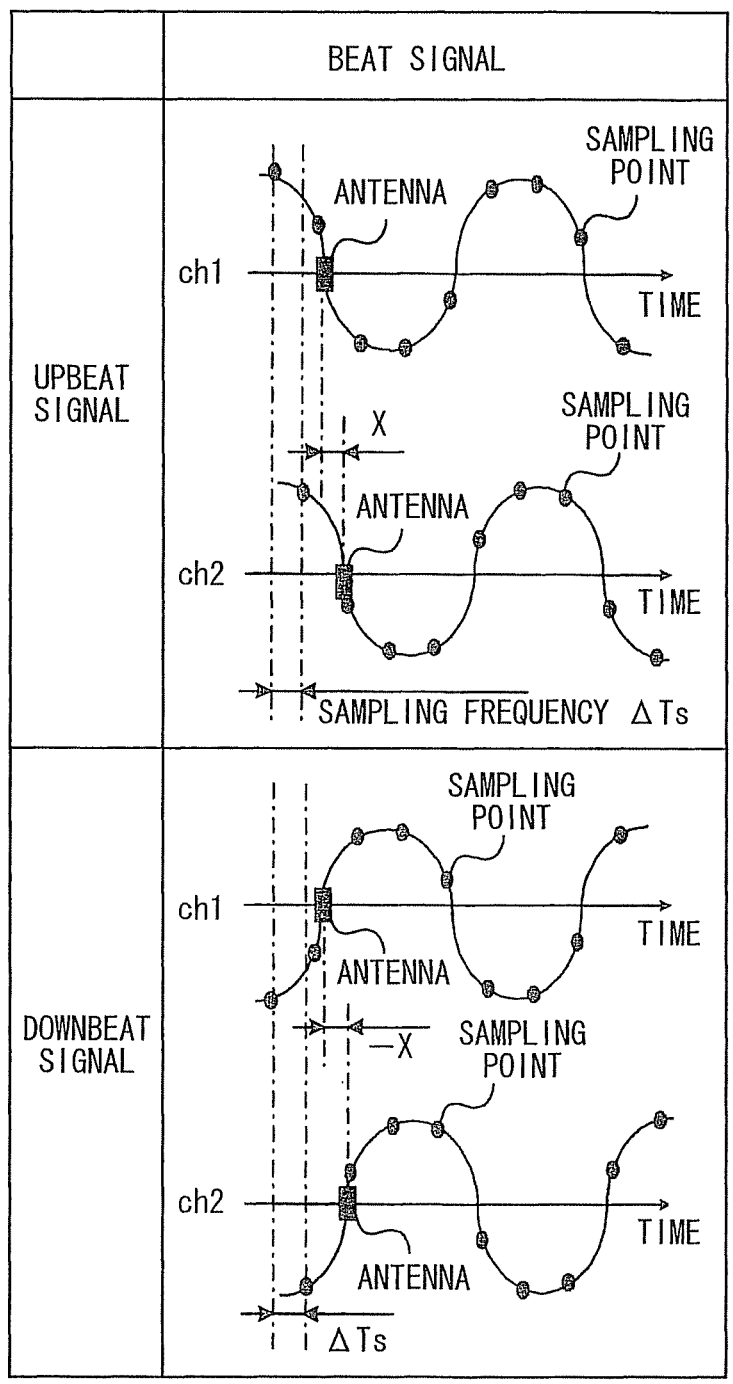
FIG. 10 is a diagram showing waveforms of beat signals with a frequency lower than the Nyquist frequency.

As shown in FIG. 10, in cases where the beat signal B has a lower frequency than the Nyquist frequency fn, the actual beat signal, which is shown by P in FIG. 9, is sampled. Thus, when a phase difference between the receiving antennas, which is shown by ch1 and ch2 in FIG. 10, is defined as X degrees, a phase difference of an upbeat signal Bu is X degrees, and a phase difference of a downbeat signal Bd is −X degrees. In other words, the phase differences of the upbeat signal Bu and the downbeat signal Bd have the same absolute values and are opposite in sign of positive and negative. Thus, pair matching of the peaks of the upbeat signal Bu and the downbeat signal Bd is possible, and the position information of the target can be acquired with accuracy.

In cases where the beat signal has a higher frequency than the Nyquist frequency fn, aliasing occurs, that is, the beat signal B is folded toward the low frequency side line-symmetrically with respect to the Nyquist frequency fn.

Figure 11:
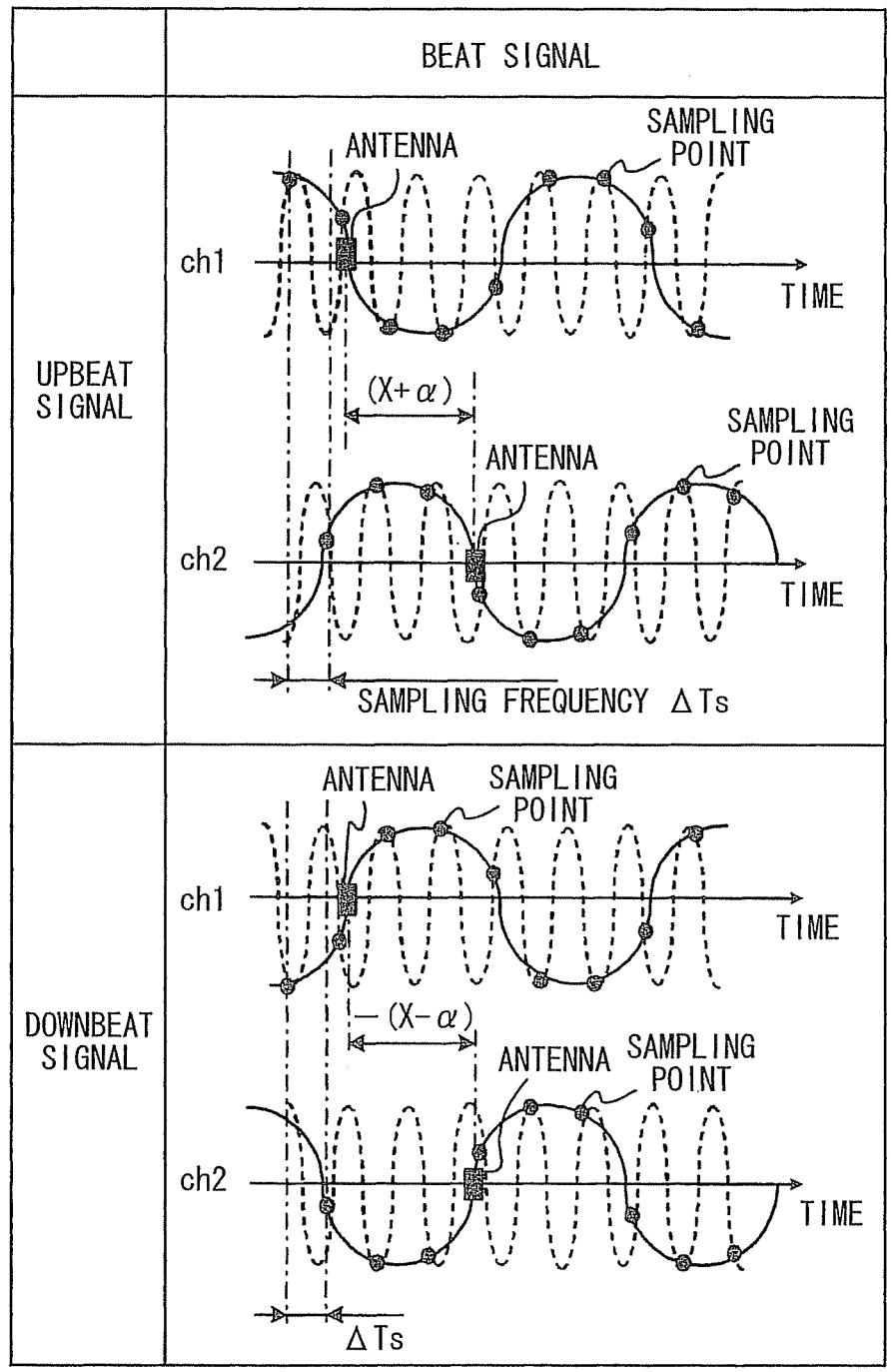
FIG. 11 is a diagram showing waveforms of beat signals with a frequency higher than the Nyquist frequency.

If the sampling is carried out with the sampling frequency fs, as shown in FIG. 11, a beat signal (aliasing) folded at the Nyquist frequency fn, which is shown by a solid line, is detected with respect to an actual waveform shown by dashed line.

Thus, as shown in FIG. 11, a phase difference of the upbeat signal Bu between receiving antennas, which are shown by ch1 and ch2, is (X+α) degrees, and a phase difference of the downbeat signal Bd is −(X−α) degrees. Thus, the upbeat signal Bu and downbeat signals are not signals having the same absolute value and being opposite in sign of positive and negative.

Therefore, pair matching of the peaks of the upbeat signal Bu and the downbeat signal Bd is impossible, and the position information of the target cannot be acquired. In the above-description, α is a correction value of the phase difference between the receiving antennas (22).

When detection angles of the upbeat signal Bu and the downbeat signal Bd are separated from each other, the line-symmetric folding of the beat signal B with respect to the Nyquist frequency fn can be restricted and the position information of the target by pair matching of the peaks of the upbeat signal Bu and the down beat signal Bd can be derived.

Thus, the signal processor (30) samples output signals of the receiving devices (24) with a selecting period shorter than a half a sampling period so that the detection angles of the upbeat signal Bu and the downbeat signal Bd are separated from each other, and the position information of the target can be derived.

A radar apparatus (2) according to a second aspect of the present disclosure includes a transmitter (10), a receiver (200), and a signal processor (300). The receiver (200) includes a plurality of receiving antennas (22), a receiving device (24), a receiver switch (26), and a selection controller (28).

The receiving device (24) mix reception signals from the receiving antennas (22) with a local signal. The receiver switch (26) selectively supplies the reception signal from one of the receiving antennas (22) to the receiving device (24).

The selection controller (28) instructs the receiver switch (26) to select one of the receiving antennas (22) in an array order at a selecting period shorter than a half of a sampling period of the signal processor (300).

Also when the receiving antennas (22) are sequentially selected in the array order by controlling the receiver switch (26) as described above, effects similar to the effects of the radar apparatus (1) according to the first aspect can be achieved.

In addition, because the radar apparatus (2) includes only one receiving device (24) which is relatively large and expensive, the radar apparatus (2) can reduce a dimension and a manufacturing cost. The detection angles of the upbeat signal Bu and the downbeat signal Bd may be separated at the maximum so that the line symmetric folding of the beat signal B with respect to the Nyquist frequency fn is restricted and the position information of the target is derived by the pair matching of the peaks of the upbeat signal Bu and the downbeat signal Bd.

When the selecting period is a quarter of the sampling period, aliasing does not occur because the detection angles of the upbeat signal Bu and the downbeat signal Bd are separated from each other at the maximum. Thus, the position information of the target can be derived with accuracy.

Figure 12A:
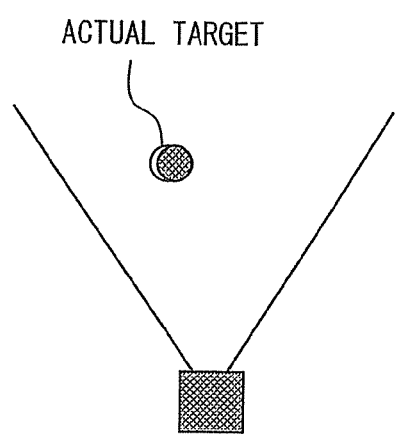
FIG. 12A and FIG. 12B are diagrams for explaining why a phase shift of receiving antennas is set to 90 degrees when one of the receiving antennas is selected with respect to a folded beat signal.
Figure 12B:
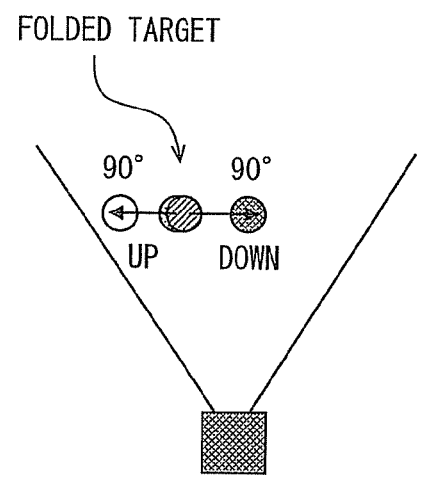

Thus, for the beat signal B that is folded line-symmetrically with reference to Nyquist frequency fn with respect to an actual target as shown in FIG. 12A, a phase shifting of each of the receiving antennas (22) needs to be 90 degrees. A receiving antenna selecting time interval (hereafter, referred to as a selecting period) tc with which the phase shift of each of the receiving antennas (22) can be 90 degrees needs to satisfy the following equation (3).

The phase shifting (90 degrees)=360 degrees×the selecting period *tc*×the sampling frequency *fs*  (3)

From the equation (3), the selecting period tc and the sampling frequency fs satisfies the following equation (4).

The selecting period *tc*×the sampling frequency *fs*=90 degrees/360 degrees=¼  (4).

Thus, by setting the selecting period tc to a quarter of the sampling period Ts (1/fs), the line symmetric folding of the beat signal B with respect to the Nyquist frequency fn can be restricted, and the pair matching of the peaks of the upbeat signal Bu and the downbeat signal Bd is possible.

In other words, a reception signal of a target that is present at a position corresponding to a higher frequency than the Nyquist frequency is less likely to be folded to a position corresponding to a lower frequency than the Nyquist frequency, and the radar apparatus (1) does not detect the target at a long distance as a target at a short distance by error.

The radar apparatus (1) does not need an anti-aliasing filter generally used for cutting a signal having a higher frequency than the Nyquist frequency fn to the sampling frequency fs of the beat signal.

The receiving antennas (22) in the receiver (20) may be arrayed linearly. In the present case, an azimuth of a target in a plane including a normal direction (front direction) and an array direction of the receiving antennas (22), such as an angle in a left to right direction in a case where a front direction is 0 degrees, can be detected. Therefore, when the receiving antennas (22) is arranged horizontally, the radar apparatus (1) can be suitably used as a front monitoring radar apparatus disposed in a vehicle.

Figure 13:
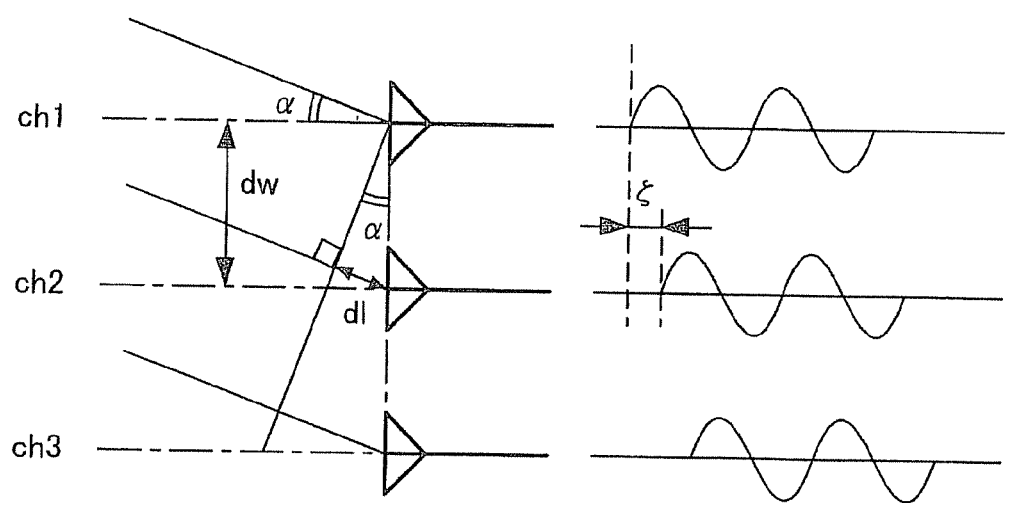
FIG. 13 is a diagram showing a principle of detecting an azimuth of a target based on phases of reception signals of receiving antennas arranged linearly.

A principle of detecting azimuth based on the phases of the reception signals of the receiving antennas (22) arranged linearly will be described with reference to FIG. 13. In an example shown in FIG. 13, the radar apparatus (1) includes three channels ch1, ch2, ch3, that is, three receiving antennas (22). A center-to-center interval of adjacent two of the receiving antennas (22) is dw, and the radar wave arrives at the receiving antennas (22) from an angle α with respect to the front direction.

The radar wave is output from a single transmitting antenna (16) and is reflected by a target that is present at a distance longer than a few meters in front of the receiving antennas (22). The reflected radar wave arrives at each of the receiving antennas (22) approximately in parallel.

Thus, a path difference dl (=dw·sin α) in accordance with the angle α is generated in the radar waves arrived at the adjacent receiver channels ch1, ch2 (or ch2 and ch3).

Due to the path difference dl, a phase difference is generated in the reception signals of the receiver channels ch1 and ch2 (or ch2 and ch3). The phase difference is treated with frequency conversion into a phase difference of the beat signal at the receiving device (24) and is transmitted to the signal processor (30). When the radar apparatus (1) is a FMCW radar apparatus and an average wavelength of the transmission signal is λ, a phase difference ζ generated in the beat signal can be expressed by the following equation (5).

$$\zeta = \frac{2\pi \cdot dl}{\lambda} \quad (5)$$

When the path difference dl is replaced by an expression with the distance dw of adjacent two of the receiving antennas and the angle α, the angle α can be expressed as the following equation (6).

$$\alpha = \sin^{-1}\left(\frac{\zeta \cdot \lambda}{2\pi \cdot dw}\right) \quad (6)$$

The azimuth information can be obtained from the equation (6) by analyzing the beat signals of the receiver channels ch1, ch2, ch3 and calculating the phase difference $\zeta$ between the receiver channels.

When the center-to-center interval dw satisfies the following equation (7), the radar apparatus (1) can detect the azimuth information of all targets within a beam range of a transmitted beam. In the equation (7), $\phi$ is a beam width and $\lambda$ is an average wavelength of the radar wave output from the transmitter (10).

$$dw \leq \frac{\lambda}{2\sin(\phi/2)} \quad (7)$$

When the equation (6) is solved for dw, the following equation (8) is obtained.

$$dw = \frac{\zeta \cdot \lambda}{2\pi \cdot \sin\alpha} \quad (8)$$

The phase difference $\zeta$ which can be determined by a phase comparison satisfies a relationship of $-\pi<\zeta<\pi$. When the beam width of the transmitted beam is $\phi$, the angle $\alpha$ which is detectable satisfies a relationship of $-\phi/2<\alpha<\phi/2$. Thus, by substituting $\zeta=\pi$ and $\alpha=\phi/2$ to the equation (8), the following equation (9) is obtained.

$$dw = \frac{\lambda}{2\sin(\phi/2)} \quad (9)$$

In practice, it is preferable that the center-to-center interval dw is set so as to detect a range wider than the beam width of the transmitted beam, and the radar apparatus (1) can acquire all required azimuth information when the center-to-center interval dw satisfies the equation (7).

First Embodiment

A radar apparatus 1 according to a first embodiment of the present disclosure will be described with reference to the drawings. As shown in FIG. 1, the radar apparatus 1 includes a transmitter 10, a receiver 20, and a signal processor 30.

The transmitter 10 generates a transmission signal that has a frequency periodically changing with time and outputs the transmission signal as a radar wave. The transmitter 10 includes an oscillator 12, a distributor 14, and a transmitting antenna 16. The oscillator 12 generates a high frequency signal in millimeter waveband which is so modulated that a frequency periodically increases and decreases. The distributor 14 divides an output signal of the oscillator 12 in power into a transmission signal Ss and a local signal L. The transmitting antenna 16 outputs a radar wave in accordance with the transmission signal Ss.

The frequency of the high frequency signal generated by the oscillator 12 changes in a triangular wave manner. For example, a central frequency Fo=76.5 GHz, a variation in frequency $\Delta F$=100 MHz, and a variation period Td=1.024 ms. A beam width of the transmitting antenna 16 is set so as to cover the whole area of a detection region of the radar apparatus 1.

The receiver 20 receives the radar wave that is output from the transmitter 10 and is reflected by a target. The receiver 20 generates a beat signal based on a reception signal of the radar wave and the local signal having the same frequency as the transmission signal. The receiver 20 includes a plurality of receiving antennas 22 and a plurality of receiving devices 24.

In the present embodiment, the receiver 20 includes eight receiving antennas 22. Each of the receiving antennas 22 may be a horn antenna. The receiving devices 24 are respectively coupled with the receiving antennas 22. Each of the receiving devices 24 includes a high frequency mixer that mixes a reception signal Sr from corresponding one of the receiving antennas 22 with the local signal L and generates a beat signal B that is a frequency component of a difference between the signals.

The receiver 20 includes eight receiver channels ch1-ch8 corresponding to the receiving antennas 22 and generates the beat signal B at the receiving devices 24 in all the receiver channels ch1 to ch8.

As shown in FIG. 2, if an angular range in which a decrease in gain of a beam formed by an antenna with respect to a front direction is within 3 dB is defined as the beam width, each of the receiving antennas 22 is so designed that the beam width thereof may cover the whole of the beam width ($\phi$=20 degrees in the present embodiment) of the transmitting antenna 16.

A center-to-center interval dw of adjacent two of the receiving antennas 22 is set to dw=8 mm so as to satisfy the equation (7) for analyzing an angle of the beam range of the transmitting antenna 16. Because the average wavelength of the radar wave $\lambda$=1/Fo=3.92 mm, it is clear that a right side of the equation (7) is 11.3 mm and the equation (7) is satisfied.

The signal processor 30 samples the beat signal generated by the receiver 20 at a predetermined sampling period Ts and derives at least position information of a target by pair matching of peaks of a rising-modulation signal of the beat signal and a falling-modulation signal of the beat signal.

When the signal processor 30 samples the beat signal, the signal processor 30 selects the plurality of (eight) receiving devices 24 in order with a selecting period tc that is a quarter of the sampling period Ts and samples the beat signal from the receiving devices 24 in order with the sampling period Ts.

The signal processor 30 includes a microcomputer including a central processing unit (CPU), a read only memory (ROM), a random access memory (RAM), and an input-output part (I/O). The signal processor 30 has an analog to digital converter (A/D converter) and a processing unit, which are not shown. The A/D converter can operate as a sampling portion that converts the beat signal B generated by the receiver 20 into digital data with the sampling period Ts. The processing unit carries out a FFT of data output from the A/D converter.

In the radar apparatus 1 according to the present embodiment, the distributor 14 divides the high frequency signal generated by the oscillator 12 in power into the transmission signal Ss and the local signal L, and the transmission signal Ss is output from the transmitting antenna as the radar wave.

The reflected wave of the radar wave output from the transmitting antenna 16 is received by all the receiving antennas 22 and the reception signals Sr of the receiver channels chi (i=1 to 8) are respectively supplied to the receiving devices 24.

Each of the receiving devices 24 generates the beat signal B by mixing the reception signal Sr with the local signal L from the distributor 14 and supplies the beat signal B to the signal processor 30. The signal processor 30 samples the beat signals B with the sampling period Ts and executes a target information detection process.

Figure 3A:
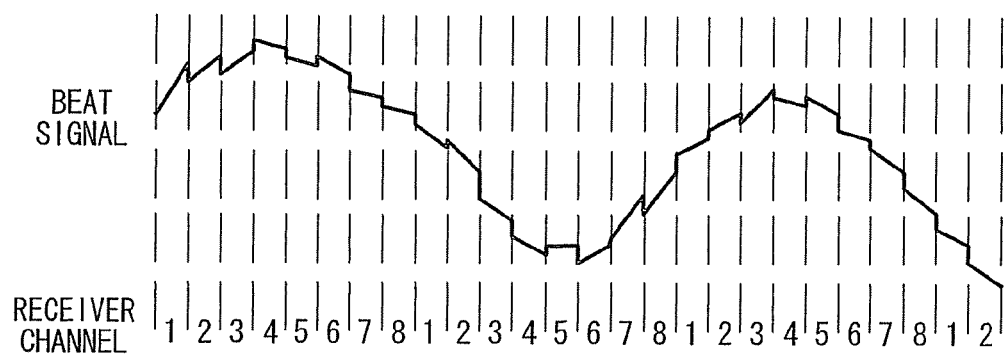
FIG. 3A is a diagram showing a waveform of a beat signal supplied to a signal processor.
Figure 3B:
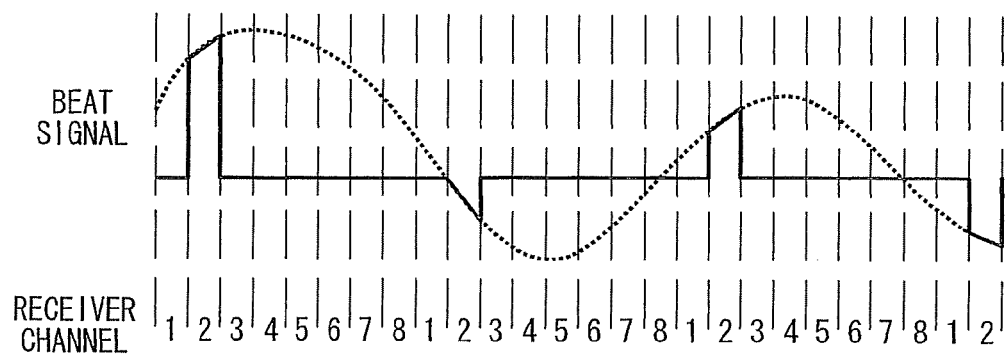
FIG. 3B is a diagram showing a waveform of a split beat signal.

Since the signal processor 30 selects the receiver channels chi in order with the selecting period tc that is a quarter of the sampling period Ts, as shown in FIG. 3A, beat signals B1 to B8 based on the reception signals Sr of the receiver channels ch1 to ch8 are time-division multiplexed.

The signal processor 30 selects each receiver channel ch1 to ch8 for a fixed selecting period tc (for example, 1 μs in the present embodiment). Thus, a selecting cycle Tx for which all the receiving channels are selected once satisfies a relationship of Tx=8×tc (=8 μs).

The signal processor 30 samples the beat signals B1 to B8 of all the receiver channels ch1 to ch8 T/Tx(=512) times every fluctuation period Td. The sampling times of the receiver channels ch1 to ch8 are shifted by the period Td.

In the signal processor 30, the sampling period Ts is 4 times the selecting period tc with which each channel (ch1 to ch8) of the receiving antennas 22 (and the receiving devices 24) is selected. In other words, the selecting period tc is a quarter of the sampling period Ts.

Figure 4:
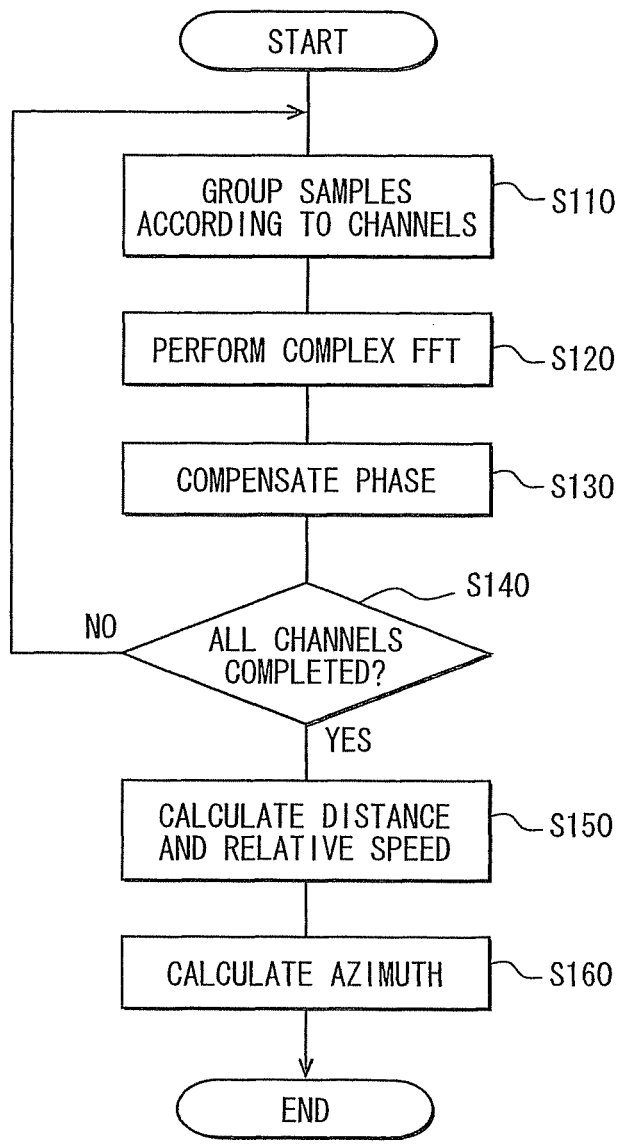
FIG. 4 is a flowchart of a target information detection process executed by a signal processor.

The target information detection process executed by the signal processor 30 will be described with reference to FIG. 4. The signal processor 30 executes the target information detection process by executing a program stored in the ROM. The signal processor 30 starts the target information detection process each time the data sampled for one fluctuation period Td of the transmission signal Ss is stored.

At S110, the CPU groups the sampled data according to the receiver channels ch1 to ch8, that is, the beat signals B1 to B8.

At S120, the CPU performs a frequency analysis by performing a complex Fourier transform (e.g., the complex FFT to which algorithm of a fast Fourier transform is applied) on the sampled data grouped at S110.

The CPU performs the complex FFT for a former half of the sampled data (rising-modulation data) and a latter half of the sampled data (falling-modulation data) separately. The CPU acquires a signal strength and a phase of each frequency component as a result of the complex FFT.

At S130, the CPU extracts a frequency component that shows a peak of the signal strength, and compensates a phase θi(fb) of the extracted frequency component (frequency fb) for all the receiver channels chi (i=1 to 8).

In the signal processor 30, when a time at which the receiver channel chi is selected is expressed as ti, a compensated phase θhi(fb) is calculated from the following equation (10) based on an elapsed time from a time t1, that is, ti−t1(=(i−1)·tc) and a phase delay δi of the reception signal Sr on a pathway from the receiving antenna 22 to the receiving device 24 of each receiver channel chi.

$$\theta hi(fb) = \theta i(fb) \cdot H1 \cdot H2 \quad (10)$$

where, $H1 = \exp\{-j \cdot 2\pi \cdot fb \cdot (i-1) \cdot tc\}$
$H2 = \exp\{-j \cdot \delta i\}$ At S140, the CPU determines whether the frequency analysis at S120 and the phase compensation at S130 are completed for all the receiver channels ch1 to ch8. If not, the CPU repeatedly executes the processes at S120 and S130 until the frequency analysis and the phase compensation are completed for all the receiver channels ch1 to ch8.

If the frequency analysis and the phase compensation are completed for all the receiver channels ch1 to ch8, which corresponds to "YES" at S140, the process proceeds to S150. At S150, the CPU extracts frequency components (frequency fu, fd) showing peaks of the signal strength at the rising modulation and the falling modulation and calculates a distance R to the target and a relative speed V of the target from the equations (1) and (2).

If there is a plurality of peaks in each modulation, the CPU pairs the peaks having similar signal strengths and calculates the distance R and the relative speed V for all the pairs.

At S160, the CPU compares the phases of the receiver channels ch1 to ch8 compensated at S130, determines a phase difference in accordance with the path difference dl of the reflected wave caused by positional relationships of the target and the receiving antennas 22, and calculates the azimuth a of the target from the equation (5) and the equation (7).

As described above, in the radar apparatus 1 according to the present embodiment, the beat signal B of the receiver channels ch1 to ch8 are time-division multiplexed.

In the present embodiment, each receiver channels ch1 to ch8 is selected in order with a short period (for example, 0.25 μs), and successive eight data can be regarded as being detected almost simultaneously. Thus, the radar apparatus 1 can detect the azimuth based on the phases of the beat signals of the receiver channels ch1 to ch8 and can improve the accuracy in azimuth detection compared with a case where only signal strengths are used.

In addition, the radar apparatus 1 compensate the shift or the delay of the phases caused at each receiver channel ch1 to ch8 based on the difference of the sampling times of the beat signals and the path difference from the receiving antenna 22 and the receiving device 24 and calculates the azimuth information based on the compensated phases. Thus, the radar apparatus 1 can detect azimuth with a high accuracy.

In the above-described example, the beam width of the transmitting antenna 16 is set to 20 degrees as an example. When the center-to-center distance of the receiving antennas 22 is 8 mm, as will be noted from the equation (6), the receiving antennas 22 can receive signals within an angle range of 28.4 degrees (±14.2 degrees) at the maximum. Thus, by increasing the beam width of the transmitting antenna 16, the detectable angle range can be expanded to 28.4 degrees at the maximum.

The receiving antennas 22 are selected in the array order with the selecting period tc that is a quarter of the sampling period Ts of the signal processor 30. Thus, the radar apparatus 1 can restrict erroneous detection of the target as described above.

Relationships between the phase difference between channels of the receiving antennas 22 and the frequencies of the beat signals B will be described with reference to FIG. 5. In the example shown in FIG. 5, the selecting period tc with which the receiver channels ch1 to ch8 of the receiving antennas 22 are selected in order is set to a quarter of the sampling period Ts of the beat signal B.

Figure 5:
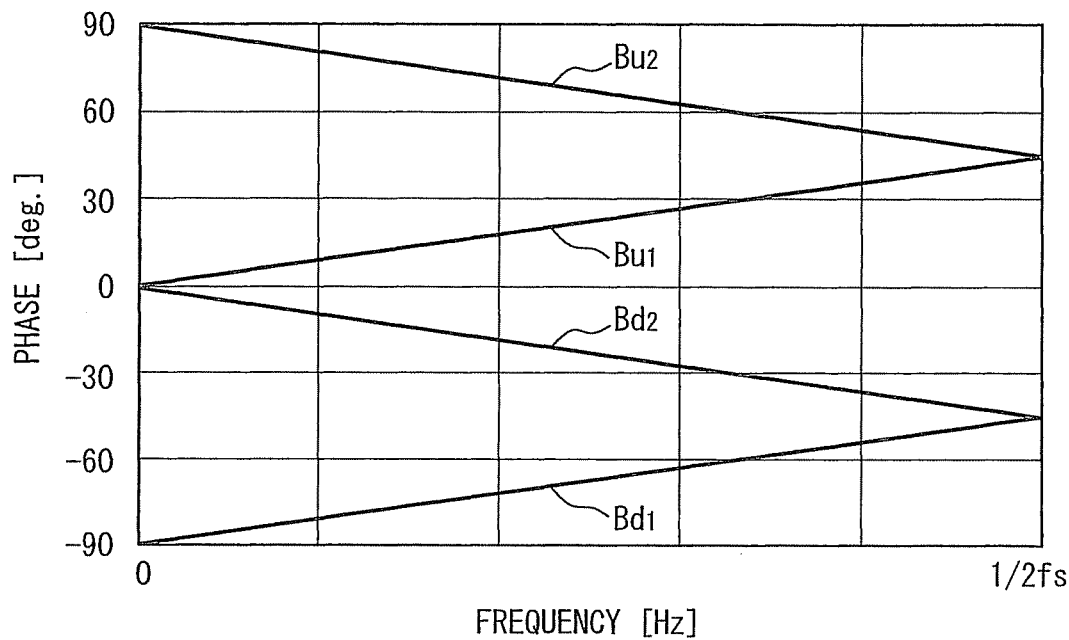
FIG. 5 is a diagram showing a relationship between a phase shift between channels of receiving antennas and a frequency of a beat signal.

As shown in FIG. 5, with a frequency lower than or equal to the Nyquist frequency, which is a half of the sampling period Ts (1/fs), a phase shifting of an upbeat signal Bu1 increases from 0 degree to 90 degrees with increase in frequency. With a frequency higher than the Nyquist frequency, the upbeat signal Bu1 is folded toward a lower frequency side with respect to the Nyquist frequency and becomes a folded upbeat signal Bu2. A phase shifting of the folded upbeat signal Bu2 seemingly increases from 45 degrees to 90 degrees with decrease in frequency.

Similarly, with a frequency lower than or equal the Nyquist frequency, a phase shifting of a downbeat signal Bd1 increases from 0 degree to −45 degrees with increase in frequency. With a frequency higher than the Nyquist frequency, a phase shifting of a folded downbeat signal Bu2 seemingly increases from −45 degrees to −90 degrees with decrease in frequency.

In this way, by setting the selecting period tc to a quarter of the sampling period Ts, the phase shifting between the channels of the receiving antenna 22 can be 90 degrees.

Next, the detection azimuth of the target and the frequency of the beat signal will be described with reference to FIG. 6.

Figure 6:
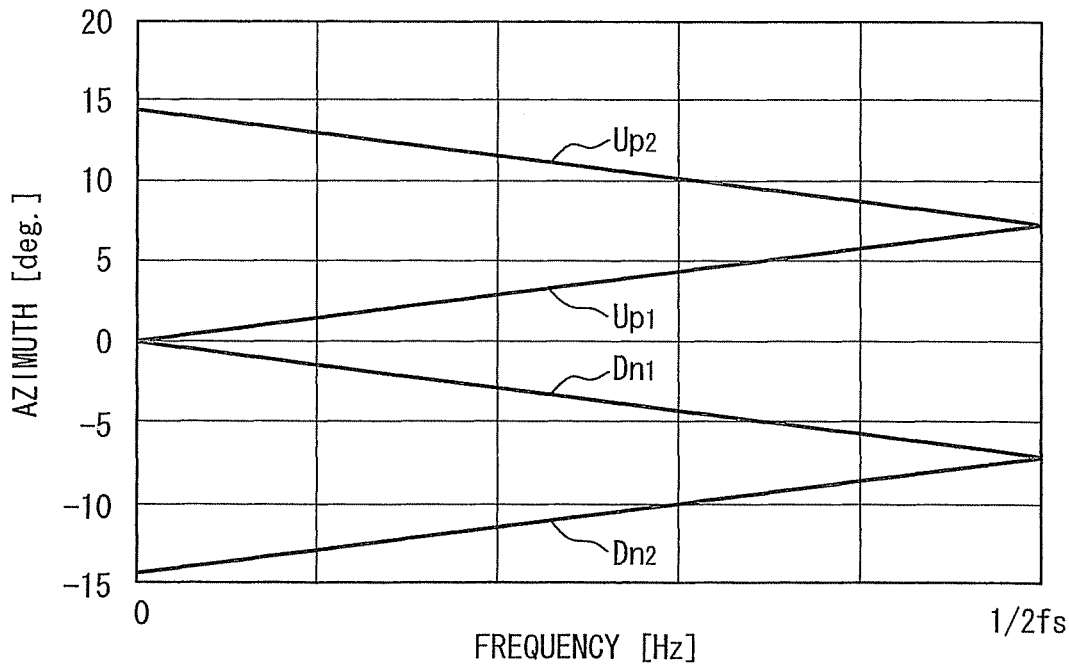
FIG. 6 is a diagram showing a relationship between a detection azimuth of a target and a frequency.

FIG. 6 shows a detection azimuth in the rising modulation and the detection azimuth in the falling modulation in a case where a target is located in front of the receiving antenna 22, that is, an azimuth of the target is 0, the distance between adjacent two channels of the receiving antennas is 3.92 mm and the selecting period tc is a quarter of the sampling period is (1/fs).

As shown in FIG. 6, in the rising modulation with a frequency lower than or equal to the Nyquist frequency (½ fs), which is shown by line Up1, the detection azimuth increases from 0 degree to 7 degrees with increase in frequency. In the rising modulation with a frequency higher than the Nyquist frequency, which is shown by line Up2, the detection azimuth is folded toward a lower frequency side with respect to the Nyquist frequency, and the azimuth seemingly increases from 7 degrees to 14 degrees with decrease in frequency, In the falling modulation with a frequency lower than or equal to the Nyquist frequency, which is shown by line Dn1, the detection azimuth increases from 0 degree to −7 degrees with increase in frequency. In the falling modulation with a frequency higher than the Nyquist frequency, which is shown by line Dn2, the detection azimuth is folded toward a lower frequency side with respect to the Nyquist frequency, and the azimuth seemingly increases from −7 degrees to −14 degrees with decrease in frequency, As described above, the detection azimuth of the folded target (aliasing) caused by sampling the beat signal B with the sampling frequency fs can be separated as supposed. Thus, even when aliasing occurs, because the detection azimuth is separated as supposed, the azimuth of the target can be detected with accuracy by the signal processing.

In addition, because the azimuth of the target can be detected with accuracy by the signal processing, the radar apparatus 1 does not need an anti-aliasing filter and a dimension of the radar apparatus 1 can be reduced.

Second Embodiment

A radar apparatus 2 according to a second embodiment of the present disclosure will be described with reference to FIG. 7 and FIG. 8.

Figure 7:
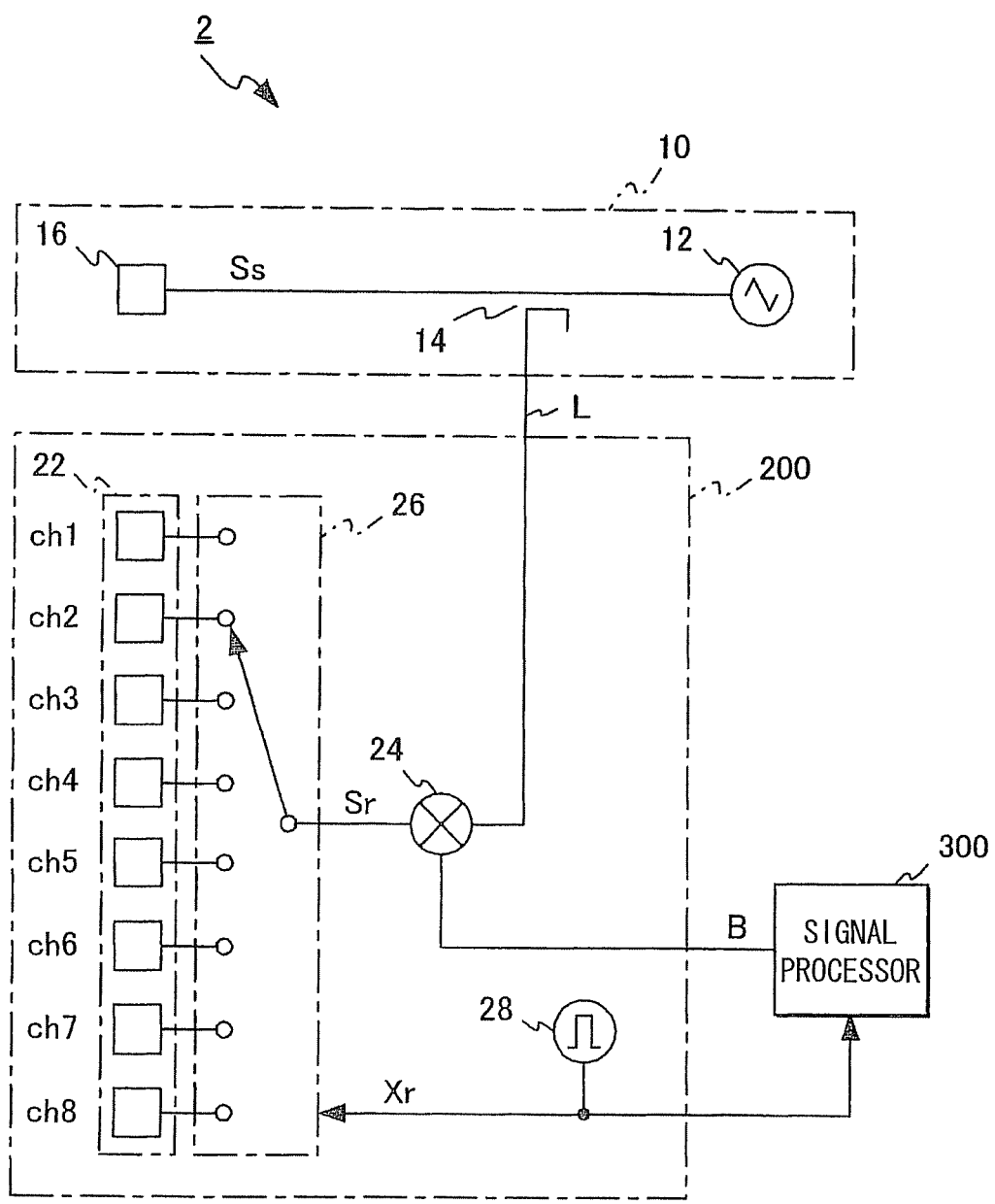
FIG. 7 is a block diagram showing a radar apparatus according to a second embodiment of the present disclosure.
Figure 8:
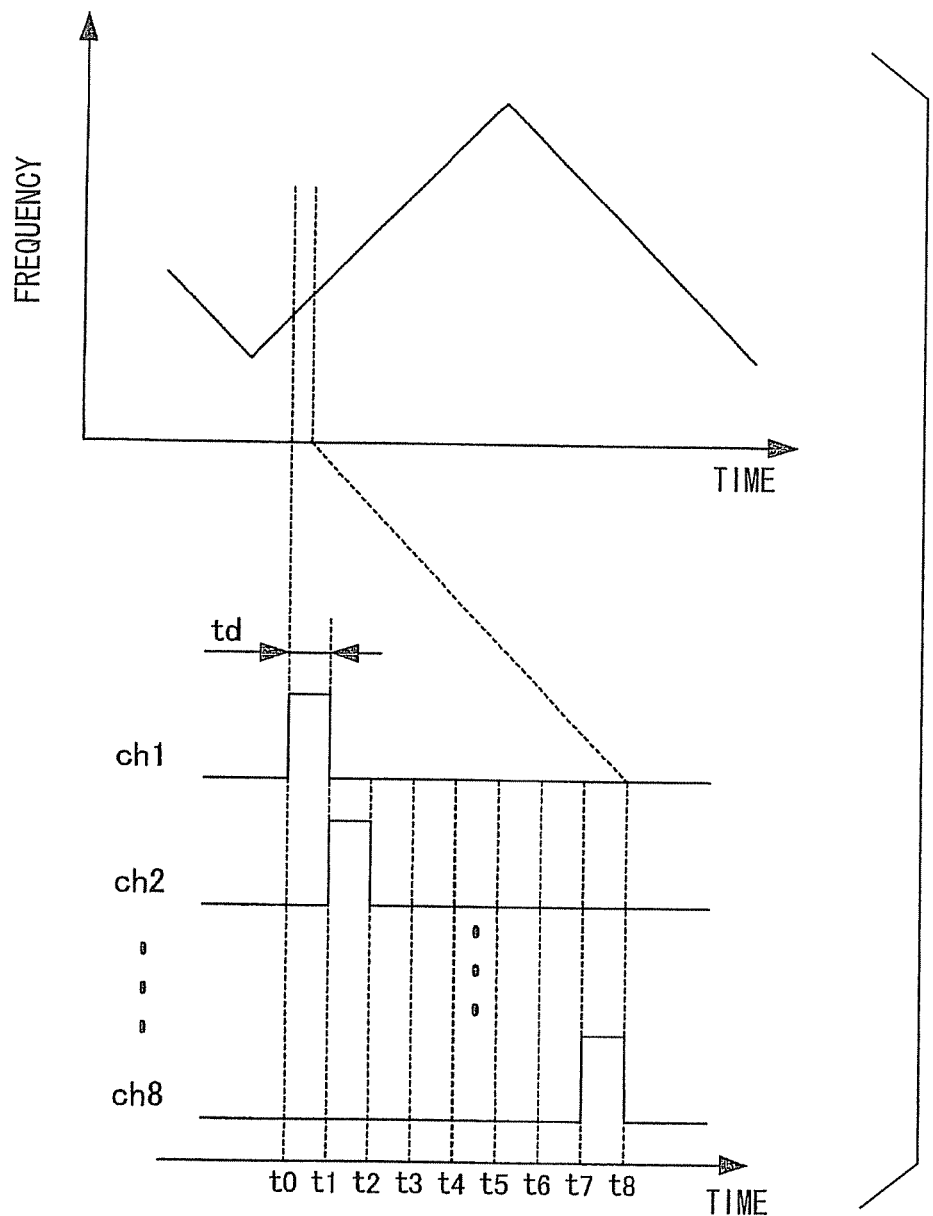
FIG. 8 is a diagram showing a selection timing of a receiver switch.

As shown in FIG. 7, the radar apparatus 2 includes a transmitter 10, a receiver 200, and a signal processor 300. The receiver 200 includes a plurality of receiving antennas 22, a receiving device 24, a receiver switch 26, and a selection signal generator 28.

The receiving device 24 includes a high frequency mixer that mixes a reception signal Sr from one of the receiving antennas 22 with a local signal L and generates a beat signal B which is a frequency component of a difference in the signals.

The receiver switch 26 selects one of the reception signals Sr from the receiving antennas 22 in accordance with a selection signal Xr and supplies the selected reception signal to the receiving device 24. The receiver switch 26 may be a high frequency switch such as a p-intrinsic-n diode (PIN diode), a metal-semiconductor field-effect transistor (MESFET), and a radio frequency microelectromechanical system switch (RF-MEMS switch).

The selection signal generator 28 generates the selection signal Xr for controlling the receiver switch 26. The selection signal generator 28 can operate as a selection control portion. As shown in FIG. 8, the selection signal generator 28 generates the selection signal Xr so that the receiver switch 26 selects the reception signals of the receiving antennas 22 in array order, that is, in order of the receiver channels ch1 to ch8. The selection signal generator 28 also outputs the selection signal Xr to the signal processor 300.

Based on the selection signal Xr from the selection signal generator 28, the receiver switch 26 selects one of the receiving antennas 22 in the array order with a selection period that is a quarter of a sampling period Ts of the beat signal B of the signal processor 300.

In other words, the receiver 200 includes eight receiver channels ch1 to ch8 corresponding to the receiving antennas 22, and all the receiver channels ch1 to ch8 share the receiving device 24 in time division.

In a manner similar to the radar apparatus 1 according to the first embodiment, when an angle range in which a reduction of a gain in a front direction is within 3 dB is expressed as a beam width, each of the receiving antennas 22 of the receiver channels ch1 to ch8 has a beam width that includes the whole beam width (for example, φ=20 degrees in the present embodiment) of the transmitting antenna 16.

A center to center distance dw between adjacent two of the receiving antennas 22 may be set to 8 mm so as to satisfy the equation (7) in a manner similar to the first embodiment. The signal processor 300 includes a microcomputer including a CPU, a ROM, a RAM, and an I/O. The signal processor 300 has an A/D converter and a processing unit which are not shown. The A/D converter operates in synchronization with the selection signal Xr. The A/D converter can operate as a sampling portion that converts the beat signal generated by the receiver 200 into digital data with the sampling period Ts. The processing unit carries out a FFT of data output from the A/D converter.

In the radar apparatus 2 according to the present embodiment, the distributor 14 divides the high frequency signal generated by the oscillator 12 in power into the transmission signal Ss and the local signal L, and the transmission signal Ss is output from the transmitting antenna 16 as the radar wave.

The reflected wave of the radar wave output from the transmitting antenna 16 is received by all the receiving antennas 22, and only the reception signal Sr of one of the receiver channels chi (i=1 to 8) selected by the receiver switch 26 is supplied to the receiving device 24.

The receiving device 24 generates the beat signal B by mixing the reception signal Sr with the local signal L from the distributor 14 and supplies the beat signal B to the signal processor 300. The signal processor 30 samples the beat signals B at a time based on the selection signal Xr and executes a target information detection process.

Because the receiver switch 26 selects the receiver channel chi in order based on the selection signal Xr, the reception signals Sr of the receiver channels are supplied with time division multiplexing to the receiving device 24.

As a result, as shown in FIG. 3A, the beat signals B1 to B8 based on the reception signals Sr of the receiver channels ch1 to ch8 are time-division multiplexed.

The receiver switch 26 selects each receiver channel ch1 to ch8 for a fixed selecting period tc (for example, 1 μs in the present embodiment). Thus, a selecting cycle Tx for which all the receiving channels are selected once by the receiver switch 26 satisfies a relationship of Tx=8×tc (=8 μs).

The signal processor 300 samples the beat signals B1 to B8 of all the receiver channels ch1 to ch8 T/Tx(=512) times every fluctuation period Td. The sampling times of the receiver channels ch1 to ch8 are shifted by the period Td.

In the signal processor 300, the sampling period Ts is 4 times the selecting period tc with which each channel (ch1 to ch8) of the receiving antennas 22 is selected by the receiver switch 26. In other words, the selecting period tc is a quarter of the sampling period Ts.

In the target information detection process executed by the signal processor 300, at S130, a time at which the receiver channel chi is selected by the receiver switch 26 is set to ti, and a compensated phase θhi(fb) is calculated from the equation (10) based on an elapsed time from a time t1, that is, ti−t1(= (i−1)·tc) and a phase delay δi of the reception signal Sr on a pathway from the receiving antenna 22 to the receiving device 24 of each receiver channel chi. The other processes in the target information detection process according to the present embodiment are similar to those in the target information detection process in the first embodiment.

As described above, in the radar apparatus 2 according to the second embodiment, the reception signals Sr of the receiver channels ch1 to ch8 are supplied with time-division multiplexing to the receiving device 24 through the receiver switch 26. The signal processor 300 samples the time-division multiplexed beat signal from the receiving device 24 and processes the beat signal with splitting the beat signal into the receiver channels ch1 to ch8.

In the radar apparatus 2 according to the present embodiment, the receiver channels ch1 to ch8 share the receiving device 24 in time division. Thus, the radar apparatus 2 needs only one receiving device 24, which is expensive, and a dimension and a manufacturing cost of the radar apparatus 2 can be reduced.

Other Embodiments

Although the present invention has been described in connection with the embodiments thereof with reference to the accompanying drawings, the scope of the present invention is not limited to the above-described embodiments and can include other embodiments.

In each of the above-described embodiments, when the beat signal is sampled, the plurality of receiving devices 24 or the plurality of receiving antennas 22 are selected in order at the selection period tc that is a quarter of the sampling period Ts of the beat signal. However, as long as the selection period tc is less than a half of the sampling period Ts, the radar apparatus can restrict a generation of aliasing and can restrict erroneous detection of a target.

In each of the above-described embodiments, the receiving antennas 22 are the horn antennas. However, the receiving antenna may also be other antennas such as patch antennas depending on a frequency to be used or a setting space.

The number of the receiving antennas 22 and the number of the receiving devices 24 may be changed optionally.

What is claimed is:

1. A radar apparatus comprising: a transmitter configured to generate a transmission signal having a frequency periodically changing with time and configured to output the transmission signal as a radar wave;
a receiver configured to receive the radar wave reflected by a target and configured to generate a beat signal based on the received radar wave and a local signal having the same frequency as the transmission signal; and
a signal processor configured to sample the beat signal generated by the receiver at a predetermined sampling period and configured to derive at least position information of the target by pair matching of peaks of a rising-modulation signal and a falling-modulation signal of the beat signal,
wherein the receiver includes a plurality of receiving antennas respectively forming receiving channels and a plurality of receiving devices respectively coupled with the plurality of receiving antennas,
wherein each of the receiving devices is configured to mix the reception signal from the corresponding receiving antenna with the local signal and is configured to output a mixed signal as the beat signal, and
wherein said signal processor is further configured to:
shift the phases of the reception signals received at the plurality of receiving antennas by selecting each of the plurality of receiving devices in order with a selecting period that is less than a half of the predetermined sampling period,
perform a predetermined phase compensation on the sampled beat signals for each of the receiver channels, and
calculate an azimuth of the target based on the compensated phases of the beat signals.

2. The radar apparatus according to claim 1, wherein the selecting period is a quarter of the predetermined sampling period.

3. The radar apparatus according to claim 1, wherein the plurality of receiving antennas are arranged linearly.

4. A radar apparatus comprising: a transmitter configured to generate a transmission signal having a frequency periodically changing with time and configured to output the transmission signal as a radar wave;
a receiver configured to receive the radar wave reflected by a target and configured to generate a beat signal based on the received radar wave and a local signal having the same frequency as the transmission signal; and
a signal processor configured to sample the beat signal generated by the receiver at a predetermined sampling period and configured to derive at least position information of the target by pair matching of peaks of a rising-modulation signal and a falling-modulation signal of the beat signal,
wherein the receiver includes a plurality of receiving antennas respectively forming receiving channels, a receiving device, a receiver switch, and a selection controller,
wherein the receiver switch is configured to supply the reception signal of one of the plurality of receiving antennas to the receiving device,
wherein the receiving device is configured to mix the reception signal from the one of the plurality of receiving antennas with the local signal,
wherein the selection controller is configured to instruct the receiver switch to select each of the plurality of receiving antennas in order with a selecting period that is less than a half of the predetermined sampling period, which shifts the phases of the reception signals received at the plurality of receiving antennas, and
wherein said signal processor is further configured to:
perform a predetermined phase compensation on the sampled beat signals for each of the receiver channels, and
calculate an azimuth of the target based on the compensated phases of the beat signals.

5. The radar apparatus according to claim 4, wherein the selecting period is a quarter of the predetermined sampling period.

6. The radar apparatus according to claim 4, wherein the plurality of receiving antennas are arranged linearly.

* * * * *